US007228250B2

(12) United States Patent
Naiman et al.

(10) Patent No.: US 7,228,250 B2
(45) Date of Patent: Jun. 5, 2007

(54) METHOD FOR TRANSPORTING AND TESTING ULTRA LOW SULFUR DIESEL

(75) Inventors: Neil G. Naiman, Findlay, OH (US); David D. Mack, Findlay, OH (US); Miriam M. Kuhn, Findlay, OH (US); R. Wesley Neff, Findlay, OH (US); Richard D. Long, Sr., Findlay, OH (US); Stephen C. Meredith, Findlay, OH (US); Charles W. Craig, Findlay, OH (US); Stephanie M. Breuer, Findlay, OH (US)

(73) Assignee: Marathon Petroleum Co., Findlay, OH (US)

( * ) Notice: Subject to any disclaimer, the term of this patent is extended or adjusted under 35 U.S.C. 154(b) by 0 days.

(21) Appl. No.: 11/218,078

(22) Filed: Aug. 31, 2005

(65) Prior Publication Data

US 2006/0047446 A1 Mar. 2, 2006

Related U.S. Application Data

(60) Provisional application No. 60/606,746, filed on Sep. 2, 2004.

(51) Int. Cl.
*G01M 19/00* (2006.01)

(52) U.S. Cl. ...................................... 702/123; 208/213

(58) Field of Classification Search ................. 702/123
See application file for complete search history.

(56) References Cited

OTHER PUBLICATIONS

"Distribution Tutorial", Pipeline Primer, Clean Diesel Fuel Implementation Workshop, Nov. 20-21, 2002.*
"Marathon Ashland Pi;e Line ULSD Testing", Clean Diesel Fuel Implementation Workshop, Nov. 20-21, 2002.*
Heavy Duty Diesel Program, U.S. Environmental Protection Agency.*

* cited by examiner

*Primary Examiner*—John Barlow
*Assistant Examiner*—Stephen J. Cherry
(74) *Attorney, Agent, or Firm*—Emch, Schaffer, Schaub & Porcello Co., L.P.A.

(57) ABSTRACT

A method for determining the variations in the sulfur content of ultra-low sulfur diesel fuel when it is transported through a petroleum transportation system includes sampling fuels at various points during barge transport, pipeline transport and in terminaling operations. New procedures and special handling regiments are developed in view of how the sulfur content of ultra-low sulfur fuel may change when transported through the system in sequence and stored with other petroleum products.

14 Claims, 13 Drawing Sheets

METHOD FOR TRANSPORTING AND TESTING ULTRA LOW SULFUR DIESEL

CROSS REFERENCE TO RELATED APPLICATIONS

This application claims the benefit of U.S. provisional patent application Ser. No. 60/606,746 filed Sep. 2, 2004.

TECHNICAL FIELD OF THE INVENTION

This invention relates to the transportation of ultra-low sulfur diesel fuel (ULSD) and the testing of ULSD for changes in the sulfur content due to contamination while being transported in a petroleum transportation system. Methods for improving the transportation of ultra-low sulfur diesel through a petroleum distribution system in order to deliver ULSD containing sulfur content at or below 15 parts per million are also included.

BACKGROUND OF THE INVENTION

As of June 2006, eighty percent (80%) of all diesel fuel produced or imported for highway vehicles will be required by the United States Environmental Protection Agency (EPA) to contain less than 15 parts per million (ppm) of sulfur. This is known as ultra-low sulfur diesel or ULSD. Liquid petroleum product transportation systems including barges, pipelines, pipeline tank farms, terminals, transports and retail storage facilities transport and store a variety of different petroleum products including products that contain a higher sulfur content. Since ULSD and other petroleum products are often transported in the same barges, pipelines and tanks and terminals, there is a concern that the higher sulfur products could contaminate the ULSD by raising its sulfur content past the 15 ppm limit. Since the EPA is allowing no more than a ±2 ppm variation in the sulfur content of ULSD, the petroleum industry is facing an immediate and difficult challenge in meeting the ULSD requirements.

This invention first tests the movement of ULSD through a typical petroleum transportation system and determines the effect of the movement on the sulfur levels of ULSD. The invention then establishes a set of procedures for preparing petroleum pipelines, pipeline tank farms, terminals, transports and retail facilities which have been previously used to transport and store higher sulfur content fuels for successfully transporting ULSD while maintaining compliant sulfur content.

The Highway Diesel Final Rule (66 Fed. Reg. 5002, Jan. 18, 2001) and the Non-road Diesel Final Rule (69 Fed. Reg. 38958, Jun. 29, 2004) provide requirements to reduce the sulfur content in diesel fuel over a specified period of time. The sulfur content limit will be enforced throughout the distribution system. The EPA allows a sulfur enforcement tolerance of ±2 ppm, allowing ULSD to contain no greater than 17 ppm sulfur content at any point in the distribution system. Maintaining measured compliance with ULSD limit of ≦15 ppm will be a challenge to the industry.

The EPA regulations include several transition dates with temporary exclusions and transition provisions. The regulations do not govern the sulfur content in products used for jet fuel, home heating fuel or stationary engines such as those used by utility companies, which can have sulfur content as high as 5000 ppm. By Jun. 1, 2006, at least 80% of produced or imported diesel fuel used for highway purposes must be ULSD. Pipelines and terminals must convert by Jul. 15, 2006, and retail outlets must be converted by Sep. 1, 2006. By June, 2010 all produced or imported highway diesel fuel must be ULSD. The deadline for downstream delivery systems is Oct. 1, 2010 and for retail is Dec. 1, 2010.

SUMMARY OF THE INVENTION

This invention tests the variations and shifts in the sulfur content of ULSD as it moves through a typical petroleum transportation system starting at the refinery tankage and moving through a variety of transport methods including barges, pipelines, storage tanks, transports and finally, to retail tankage. In preparing for the new EPA laws that take effect in June of 2006 requiring a ULSD sulfur content of ≦15 ppm, it was critical to determine if ULSD could be transported through a petroleum transportation system without an increase in sulfur levels that would render the fuel non-compliant. The testing methodology determined the effect that a typical transportation system might have on ULSD. New procedures and special handling requirements were developed for transporting ULSD through various transportation systems to its final retail storage location. This invention includes processes for setting up transportation system field tests, developing test procedures, field training, implementation, lab sample analysis and posting test results. The invention also identifies any special handling procedures that are necessary for transporting ULSD through a petroleum transportation system including marine, terminal, pipeline, and storage and retail distribution systems while maintaining a compliant level of sulfur (≦15 ppm).

DETAILED DESCRIPTION OF THE PREFERRED EMBODIMENT(S)

Test Procedures

Figure 1:
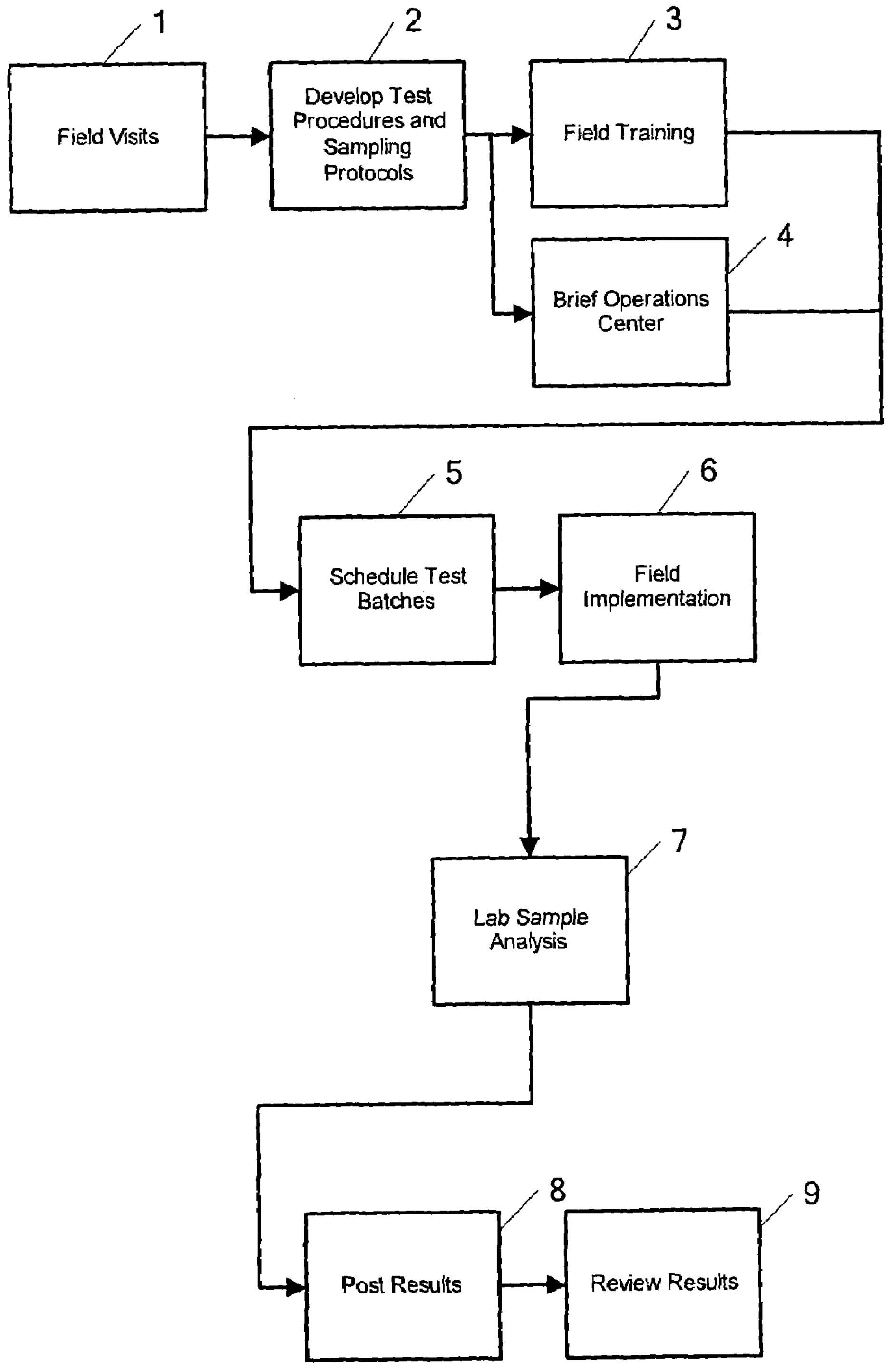
FIG. 1 is a generalized overview of the testing method process.

Extensive testing, investigations and experimentation in methods and procedures for transporting ULSD were conducted. ULSD was transported through aspects of petroleum transportation systems, including marine terminals, barges, pipelines, pipeline stations and tank farms, transport trucks and tank and storage facilities. Product samples were taken at all facilities. A generalized overview and examples of the variety of testing method processes are shown in FIG. 1. Members of the testing team performed field visits to all sampling sites to meet with key site personnel in the field (FIG. 1, Item 1). During these visits site walk-throughs were conducted to identify key equipment and possible issues that may occur during testing. Input from site personnel was gathered and taken into account when determining test procedures and protocols.

In FIG. 1, Item 2, after the site visits were completed, the test procedures and sampling protocols were developed. The test procedures determine the proposed movement of ULSD batches through the system. The procedures and protocols include specific instructions on advance preparations, batch configurations, cut procedures, and sampling protocols.

Batches were configured to allow for specific experiments on batch sequencing and the impact of system design and operations on ULSD as it is moved through the transportation system. Site-specific written test procedures were also developed. The test procedures were utilized in Item 3, field training, and the operations center was also briefed on the procedures (FIG. 1, Item 6).

In FIG. 1, Item 3, second field visits were conducted to all sites involved in the test to review the written test procedures. Training was provided to field personnel on necessary preparations, sampling procedures, and expectations. During the tests the training gave field personnel an opportunity to provide additional input and guidance to ensure that the sampling and testing procedures were workable. Additional suggestions were incorporated into the procedures.

In FIG. 1, Item 4, operations center specialists were briefed on test procedures and expectations. The operations center provided an analyst full time to work with the test team during batch movements when the specific test complexities warranted additional assistance. By providing an analyst during test batch movements, the operations center could still handle normal movements of products without interruption.

In FIG. 1, Item 5, batch configurations and proposed test movements were reviewed with distribution, planning, and product scheduling departments as necessary. These departmental meetings were held to determine the feasibility of the test movements and ensure understanding of the test objectives. The various distribution and scheduling departments are needed for the acquisition and scheduling of sufficient supplies of ULSD and other products and the batching and movement of these and other products through the transportation system. Batches of these products were then scheduled and configured as proposed by the testing team.

In FIG. 1, Item 6, test team members went to field testing sites during batch movements through the system to provide guidance and support to the field personnel. Advance meetings were held with all involved field personnel for one final walk-through of the test procedures and to resolve any last minute issues. During sampling of the batches, test team members assisted field personnel with data and sample collection. Team members were on site during the sampling process to ensure understanding of what actually occurred and to resolve any issues.

In FIG. 1, Item 7, samples that were gathered from the infield tests were analyzed at a central analysis laboratory. The results of the sample analysis were compiled and posted in a central folder on the corporate computer system (FIG. 1, Item 8). By posting these results on the corporate network, data could quickly be shared and accessed and real time test results could be seen by test team members.

In FIG. 1, Item 9, the team reviewed the test process and compiled lessons learned to be incorporated in subsequent testing and operating procedures.

Figure 2:
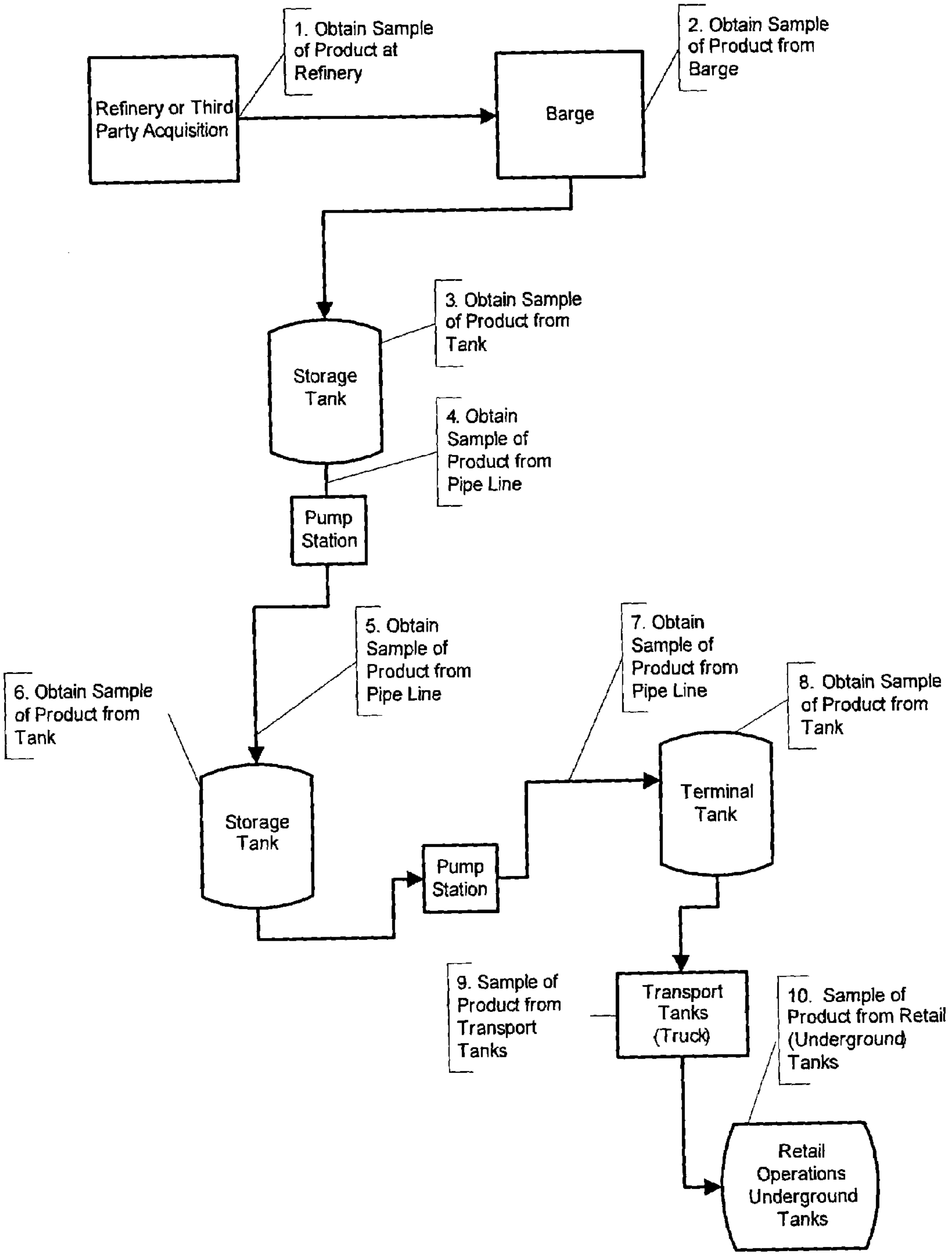
FIG. 2 shows a general example of sampling points throughout a typical petroleum transportation system.

FIG. 2 illustrates a general representation of in-field sampling that includes variations in the testing protocol; the number and location of samples taken will vary depending upon the specific transportation system being tested. All samples gathered during the test were sent to a lab for analysis.

Products were sent through the transportation system in sequenced batches, which is typical of petroleum movements in normal operation. For purposes of testing, the sequence of batches being moved through the system were comprised of various interfaces of ULSD with batches of high-sulfur diesel fuel, low-sulfur diesel fuel and other petroleum products in an effort to determine whether sulfur migration into the ULSD occurred. Testing was set up at various sample points throughout the transportation system (as shown in FIG. 2) to determine the effect that various locations in the transportation system had on the interface between the ULSD and the various other petroleum products. The goal was to determine the extent of any interface and to determine, for instance, when one batch of a higher sulfur product ends and a batch of ULSD begins in a pipeline. The data gathered was then used to assist in developing strategies for determining when a clean "cut" should be made in the batch sequences. A product "cut" is made between batch sequences to enable uncontaminated product A to be directed into one tank and uncontaminated product B to be directed to another tank. An important goal of this test method was to determine how to best make accurate cuts in the field under normal circumstances, and how cuts have to be made in order to preserve the integrity of the 15 ppm of sulfur specification required of ULSD.

In addition, this testing method helped determine the accuracy of in-line gravity testers in the field, and whether change in gravity is a reliable indicator of change in products. Ultimately, the goal was to determine if the correlation between gravity and sulfur content is an accurate aid in helping field personnel make accurate protective product cuts between batches of ULSD and other products.

In the generalized example of FIG. 2, Item 1, an initial sample of ULSD was taken at the refinery or when the product was acquired from a third party to determine the baseline amount of sulfur in ppm. Next, the ULSD from the refinery or third party was loaded onto a barge. The barge had previously been emptied of its prior ingredients according to normal operating procedures. A sample of the ULSD was drawn from the barge and its sulfur content was tested (FIG. 2, Item 2). Upon reaching the destination the barge was again sampled to determine the impact of barge transportation on sulfur content. From the barge, the ULSD was loaded into a terminal storage tank which was previously loaded with a higher sulfur diesel but had been drained. A sample of the ULSD was taken from the tank for testing of the sulfur content (FIG. 2, Item 3). In FIG. 2, Item 4, a sample of ULSD was taken from the pipeline system exiting the terminal tank. In the pipeline, the ULSD was batch sequenced with other products. Understanding the interface characteristics provides information for developing procedures to properly cut the batches. This information could provide operators the ability to properly 'cut' the batches using indicators such as red dye and in-line specific gravity testing. In FIG. 2, Item 5, samples of the products were taken from the delivery end of the pipeline, downstream of a gravitometer. The gravitometer readings were recorded to determine if gravity readings are a useful tool in detecting a change in sulfur content. Also noted was whether the sulfur content changes could be directly correlated to a visual change when red dye used to identify specific products in the batch sequence. By taking samples for analysis and noting changes in the gravitometers and visual changes in product coloration, it could be determined if these in-field indicators directly correlated to sulfur content change and if the indicators were a reliable method for making accurate product cuts during a typical transport scenario.

In FIG. 2, Item 6, samples were also taken from a storage tank for sulfur content testing. Again, as with the other tanks in this typical testing scenario, the tank was drained prior to filling with ULSD, but no extraordinary steps were taken over and above normal tank draining procedures. Samples were again taken (FIG. 2, Item 7) from the pipeline prior to the ULSD entering the next tank in the test. In the final phase of this typical test scenario, the ULSD was pumped into a tank that contained a higher sulfur product. In FIG. 2, Item 8, the goal in this case was to determine if the ULSD stratifies (layers) with the higher sulfur product and how tank sampling in terminal tanks that previously stored other distillate products can be done to yield accurate sulfur readings. To test the impact of sulfur contamination when using petroleum transport trucks, ULSD was loaded into transports of varying types and the ULSD was sampled and tested for sulfur content (FIG. 2, Item 9).

ULSD was also sampled after being delivered to underground storage tanks in retail operations (FIG. 2, Item 10).

Test Results and Analysis

Extensive in-field tests that used the typical test procedures described above were performed in:

Marine/Barge Operations

Storage Tank, Pipeline, Transport and Retail Operations

The objectives of these tests were to:

- Determine overall sulfur degradation of ULSD during typical fuel movements.
- Test trail back and trail forward of sulfur in pipeline movements in order to develop batch sequencing recommendations and cut procedures.
- Correlate the change in gravity and red dye with the change in sulfur to aid in developing procedures for making "protective" product cuts.
- Test the impact of change of service in transport truck operations
- Test the impact of the tank change of service in both terminal and retail operations.

The purpose of the marine operations test was to determine the change in sulfur content of ULSD during marine (barge) loading operations. For example, in one field test, the test began with a tank of ULSD having a sulfur level of 9.9 ppm. Prior to loading the barge from the tank, normal emptying procedures were used to drain the barge compartments. Another test involved jet fuel having a sulfur content greater than 1400 ppm being first run through the barge loading line and then displaced with ULSD simulating a barge loading. Samples were drawn from the line at the interface of the jet fuel and ULSD for sulfur evaluation.

The results of the barge loading test described above also established that:

- There was no impact on the sulfur content during transport of ULSD via barge.
- There was no gain in sulfur content when loading the barge from terminal tankage.
- Barge emptying procedures to drain barge compartments provided adequate barge cleanliness to protect the quality of ULSD.
- Barge loading from tankage presents no problems beyond the creation of a nominal interface.

Figure 3:
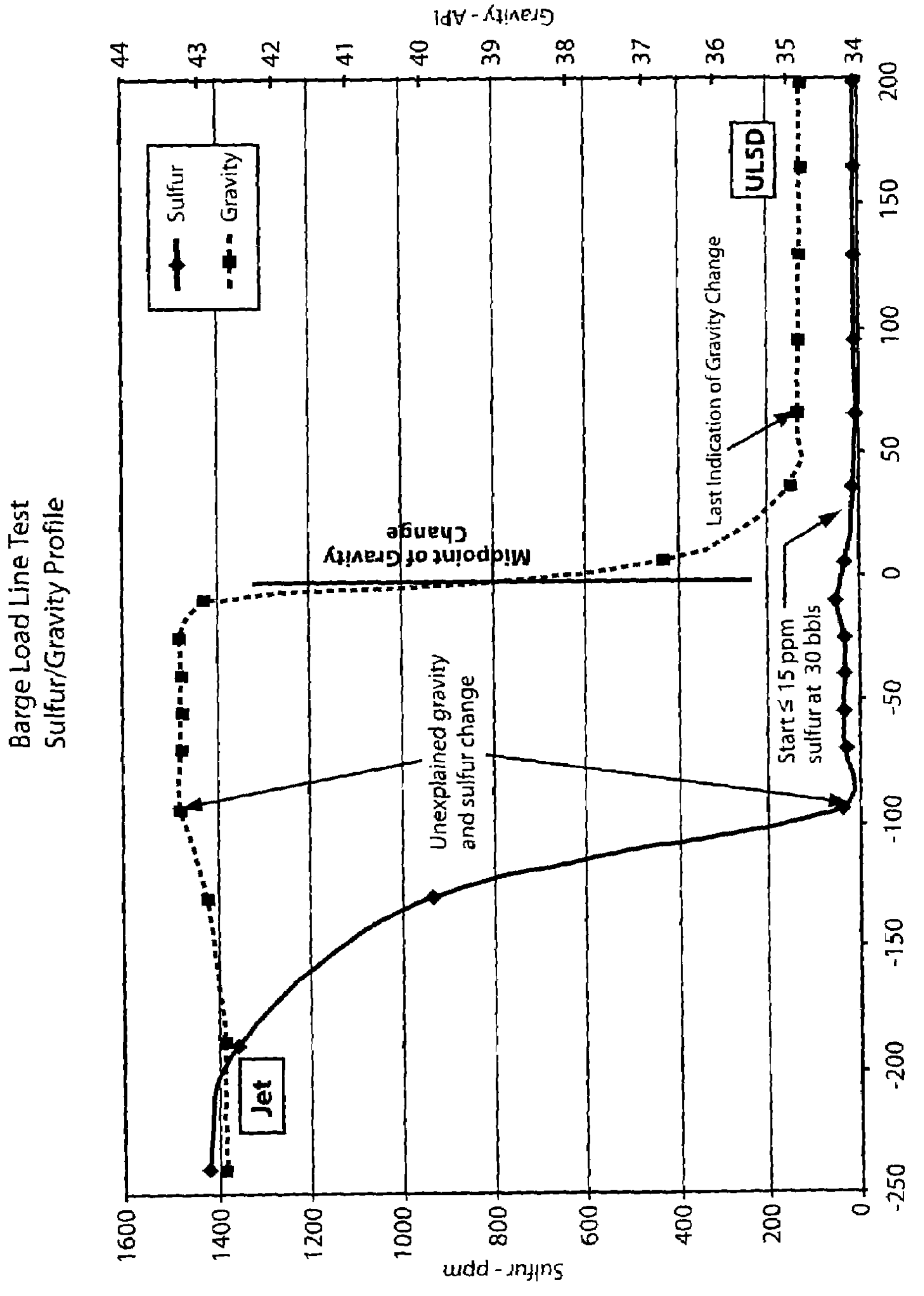
FIG. 3 is a graph showing the API gravity and sulfur content profile of an interface between Low Sulfur Diesel (LSD) and ULSD during an in field test during the off loading of a barge.

Several tests were performed at different locations to determine how the ULSD sulfur levels were affected during a marine barge off-loading process. The off-loading is performed by moving the ULSD from the barge, through a barge line and into a tank at the terminal. Prior to unloading the ULSD from the barge, LSD was sent through the barge line. For example, FIG. 3 shows the product movement of the LSD line fill, the interface between the products and the barrels of ULSD delivered to the terminal tank. The data for FIG. 3 were obtained by sampling at the terminal tank valve. The graph in FIG. 3 provides a sulfur and gravity profile for the barge off-loading. There was no sulfur contamination after the head-end interface. The sulfur content is </=15 ppm 55 barrels after the midpoint of the interface.

The results of the barge off-loading test established that barge off-loading operations did not contaminate ULSD beyond the head-end and tail-end of the interfaces.

Additional testing of pipelines, pipeline stations, and tank farms, transport trucks and tank and storage facilities was performed.

In one field test, 15,000 barrels of ULSD from a storage tank (storage tank 1) were delivered to a second storage tank which had previously stored LSD (storage tank 2) via a pipeline in a batch sequence of LSD/ULSD/gasoline. From this secondary storage tank, approximately 10,000 barrels were delivered via another pipeline to a storage tank (storage tank 3). The destination tank contained approximately 8,200 barrels of LSD at the time of ULSD delivery. In this test, the batch sequence was HSD/ULSD/gasoline.

During this pipeline test:

- Sumps were not allowed to drain.
- No drag reducing agent was used.
- Pipeline cuts were specifically designed to be conservative to maintain the ULSD product for tests further downstream.
- The terminal storage and secondary storage tanks were drained prior to pumping in ULSD.

Figure 4:
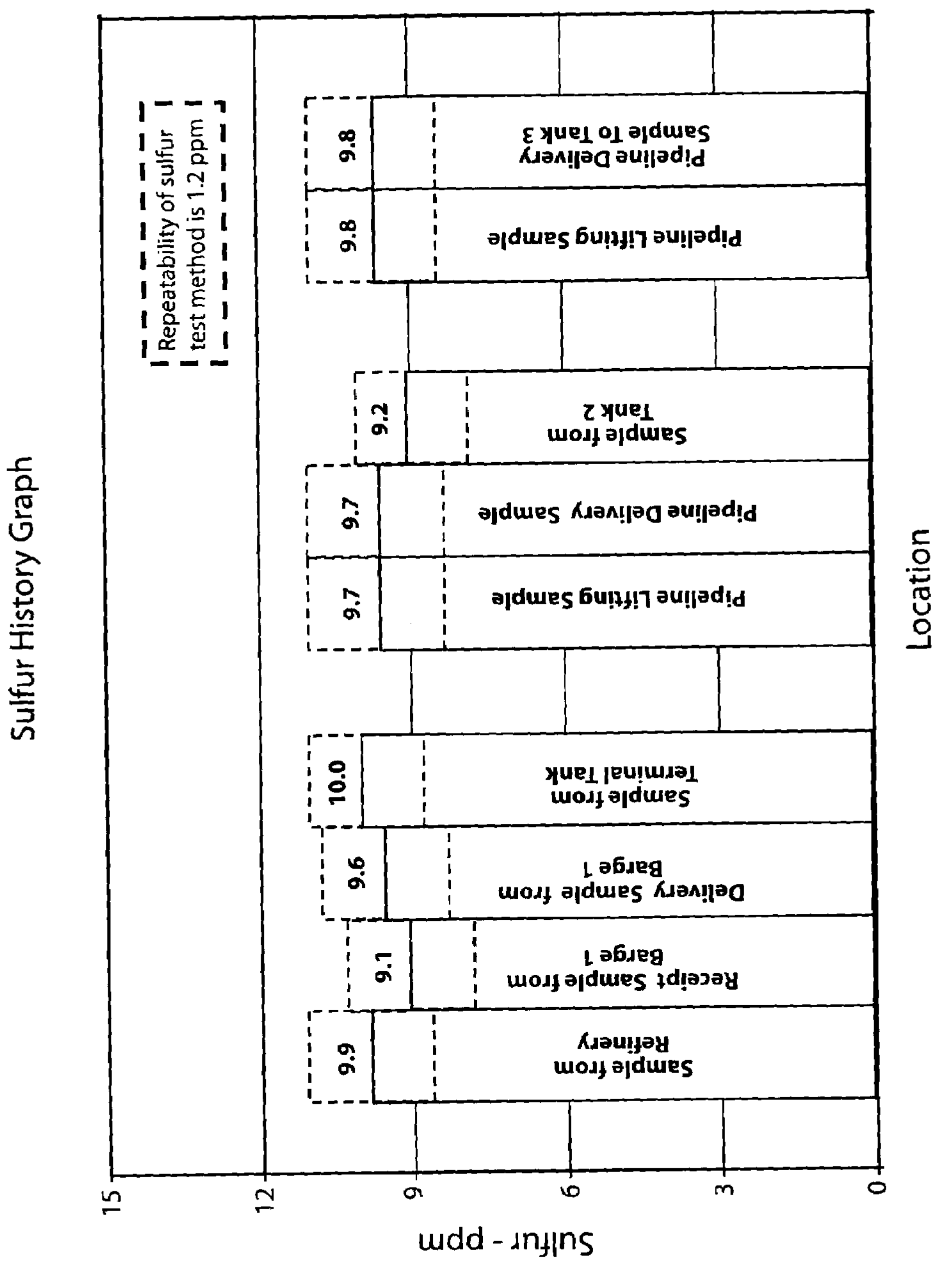
FIG. 4 is a graph showing the average ppm of sulfur of ULSD during pipeline movements taken at various sample points during an in field test.

During this test, samples were taken from the pipelines and storage tanks in a similar fashion as described in FIG. 2 of the drawings. The graph in FIG. 4 shows the average ppm from various samples drawn during this test. As seen in the FIG. 4 Sulfur History graph, the pipeline movements did not show significant sulfur degradation between tanks due to pipeline transport.

Figure 5:
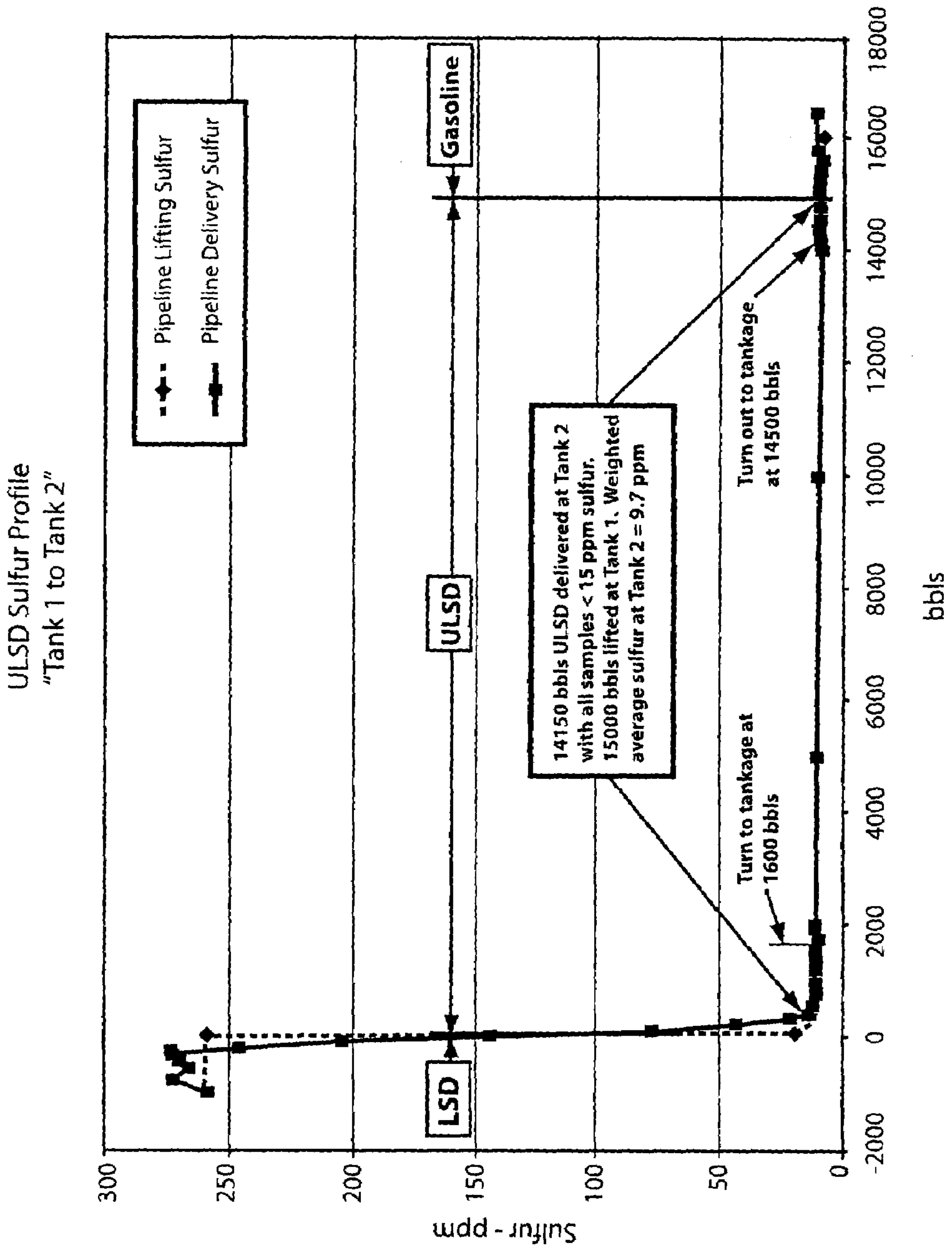
FIG. 5 is a graph showing the sulfur profile for a product movement of gasoline, ULSD and LSD between two storage tanks (tank 1 and 2) during an in field test.

The graph in FIG. 5 provides the sulfur profile for the movement of the batch sequence LSD/ULSD/gasoline between storage tank 1 and storage tank 2. The data for the graph was obtained by sampling at the start of the pipeline after exiting tank 1 and at the pipeline delivery point prior to delivery into tank 2. There was no contamination in the middle of the ULSD batch as it moved through the pipeline system. This movement lost a total of 850 barrels due to the interface with some apparent trail back of sulfur at the head-end. The interface for this movement is consistent with typical interfaces on this pipeline. A total of 14,150 barrels were delivered at a weighted average of 9.7 ppm sulfur.

Figure 6:
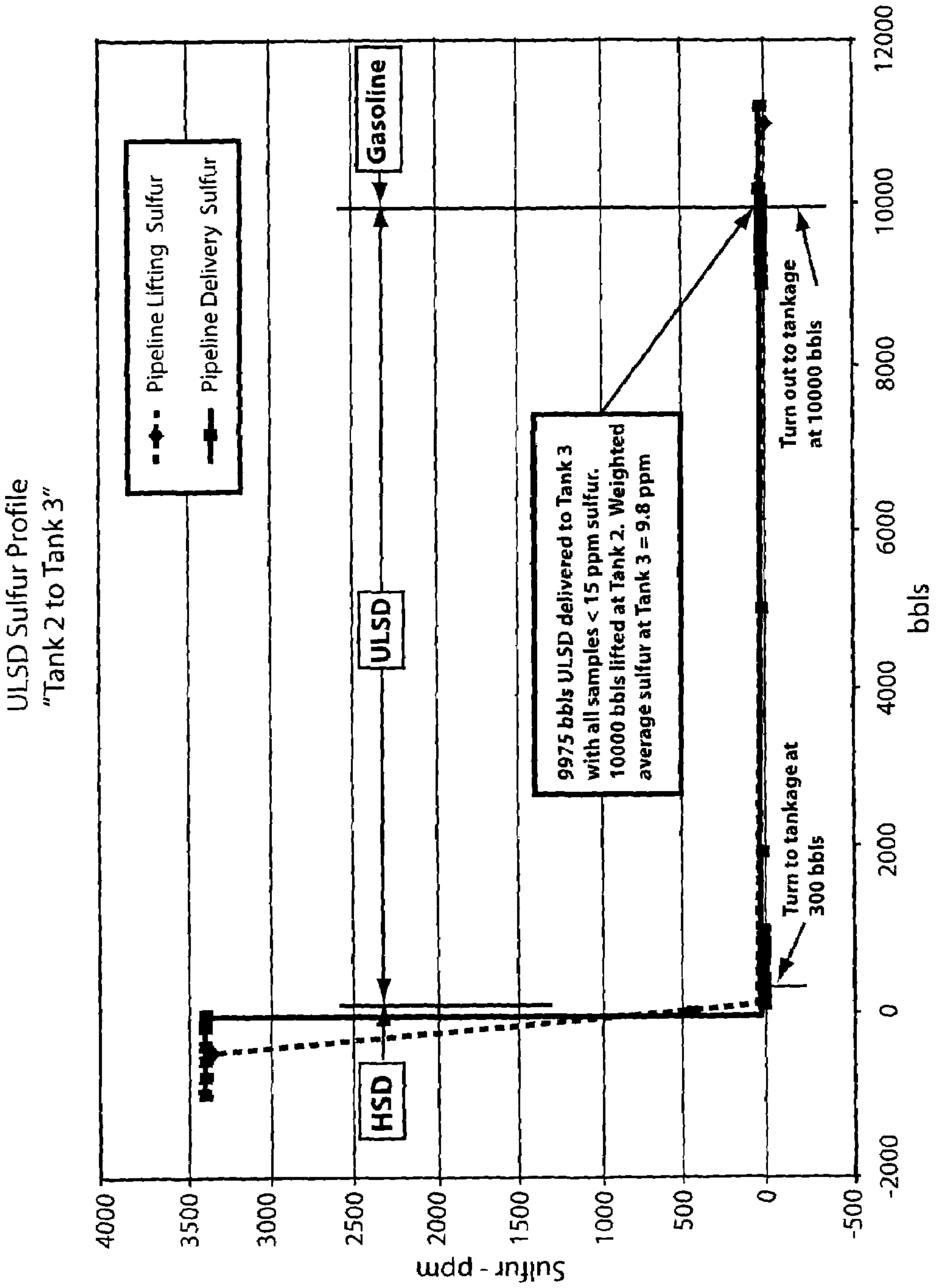
FIG. 6 is a graph showing the sulfur profile for a product movement of gasoline, ULSD and HSD between two storage tanks (tank 2 and 3) during an in field test.

The graph in FIG. 6 provides the sulfur profile for the movement of the batch sequence HSD/ULSD/gasoline between storage tank 2 and storage tank 3. The data for the graph was obtained by sampling at the start of the pipeline after exiting tank 2 and at the pipeline delivery point prior to delivery into tank 3. There was no contamination in the middle of the ULSD batch as it moved through the pipeline system. The interface for this movement is consistent with typical interfaces on this pipeline. A total of 9,975 barrels were delivered at a weighted average of 9.8 ppm sulfur during this movement.

Figure 7:
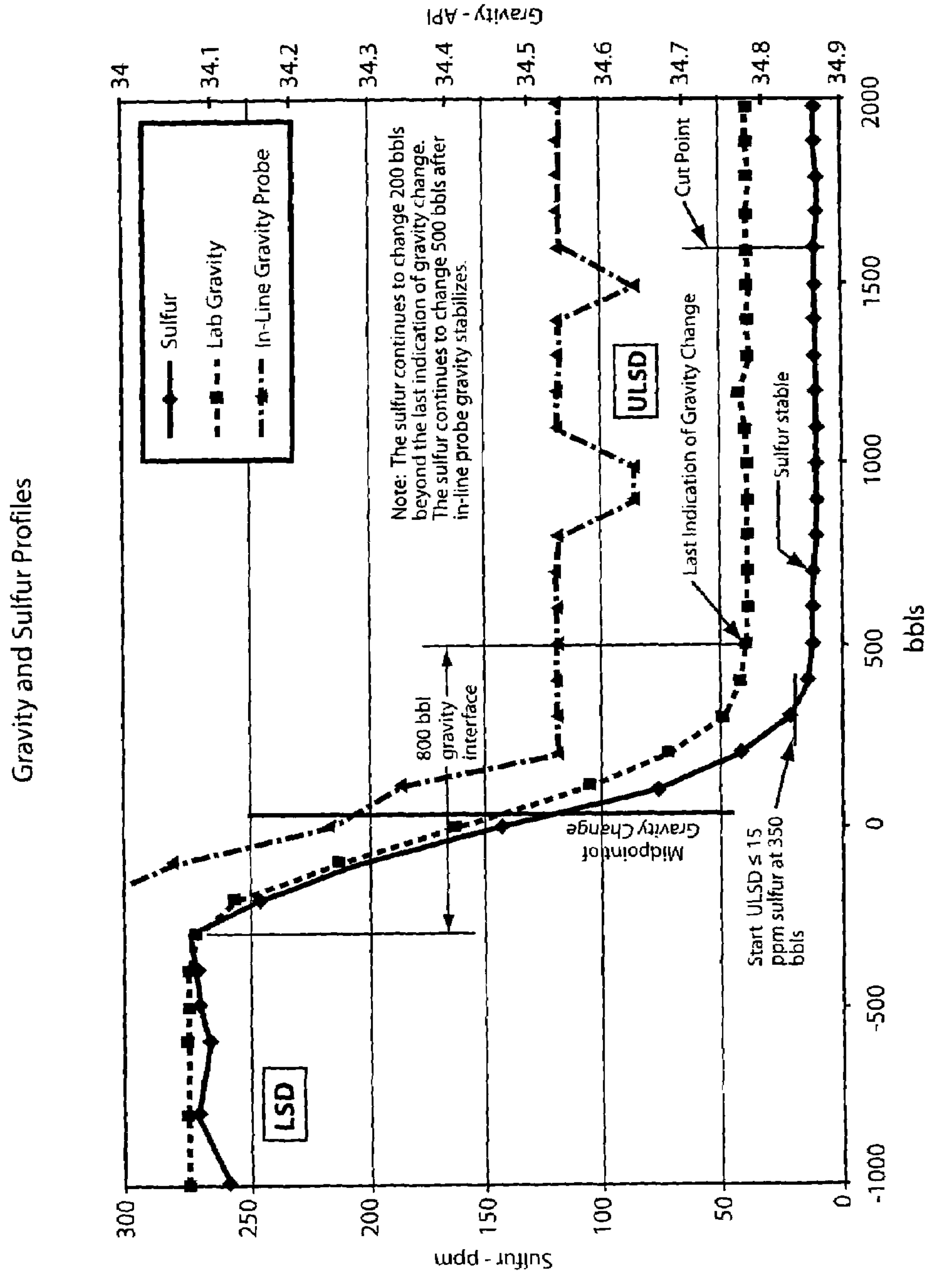
FIG. 7 is a graph showing gravity and sulfur profiles for the interface between LSD and ULSD during a pipeline movement and compares gravity readings from laboratory tests to those readings taken by field instruments.

The graph in FIG. 7 shows the gravity and sulfur profiles at the LSD and ULSD interface at the end of the pipeline at storage tank 2. This graph is for the head-end of the ULSD batch.

In addition to the overall sulfur profiles, the graph in FIG. 7 also shows the relative gravity readings determined by laboratory testing as compared to those from an in-line gravitometer. The gravitometer is a device used in the field which is an in-line tester that provides specific gravity readings of fuel as it flows through a pipeline. By comparing actual lab test results with the in-line gravitometer readings, the efficacy of in-field readings can be determined. One of the findings and conclusions of this testing method is that in-line gravity testing of fuels is an indicator of sulfur content change and is a reliable method for determining when to make protective pipeline cuts between product batches. For example, in one field test, the sulfur change from LSD to ULSD declined as the gravity decreased. The gravity interface was approximately 800 barrels, but the sulfur continued to decrease an additional 200 barrels beyond the detected gravity interface. This indicates that the change in sulfur and the change in gravity did correlate, with some apparent trail back in sulfur after the gravity stabilized. The sulfur trail back in this case is minimal due to the small difference between the sulfur levels of LSD and ULSD. This test concluded that normal cut procedures are sufficient for protecting the quality of ULSD when batched with other low sulfur products. (<500 ppm).

Figure 8:
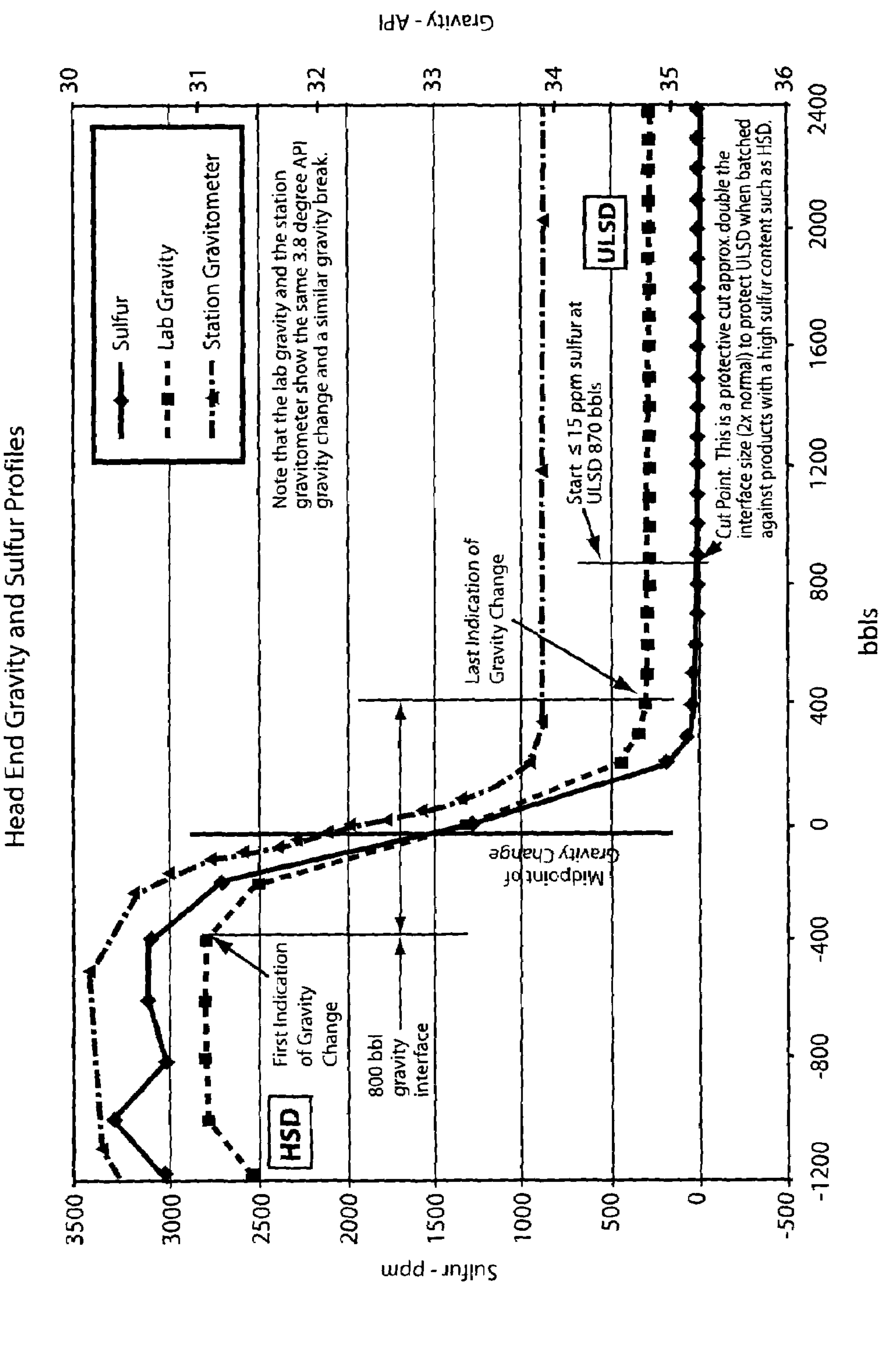
FIG. 8 is a graph showing gravity and sulfur profiles for the interface between HSD and ULSD during a pipeline movement and compares gravity readings from laboratory tests to those readings taken in the field.

The graph in FIG. 8 shows the sulfur and gravity profile during one field test when a high sulfur fuel (>500 ppm) such as HSD is batched against ULSD in a typical pipeline system. This test showed that although the gravity interface was approximately 800 barrels, the sulfur continued to decrease an additional 1300 barrels beyond the gravity interface. The change in sulfur and gravity did correlate, but significant sulfur trailback existed after the last indication of gravity change. The sulfur trailback is caused by the large difference between the sulfur levels of ULSD and HSD (10 ppm vs. 3000 ppm respectively). If the product cut in this scenario was made at the last indication of gravity change, 1,300 barrels of ULSD with an average of 16.1 ppm sulfur would have been cut into the ULSD tank. The conclusion from this test was that normal cuts are not sufficient when batching ULSD behind higher sulfur (>500 PPM) products. Protective cuts must be at least double the gravity interface volume in order to maintain the quality of ULSD when it trails behind of high sulfur products.

Figure 9:
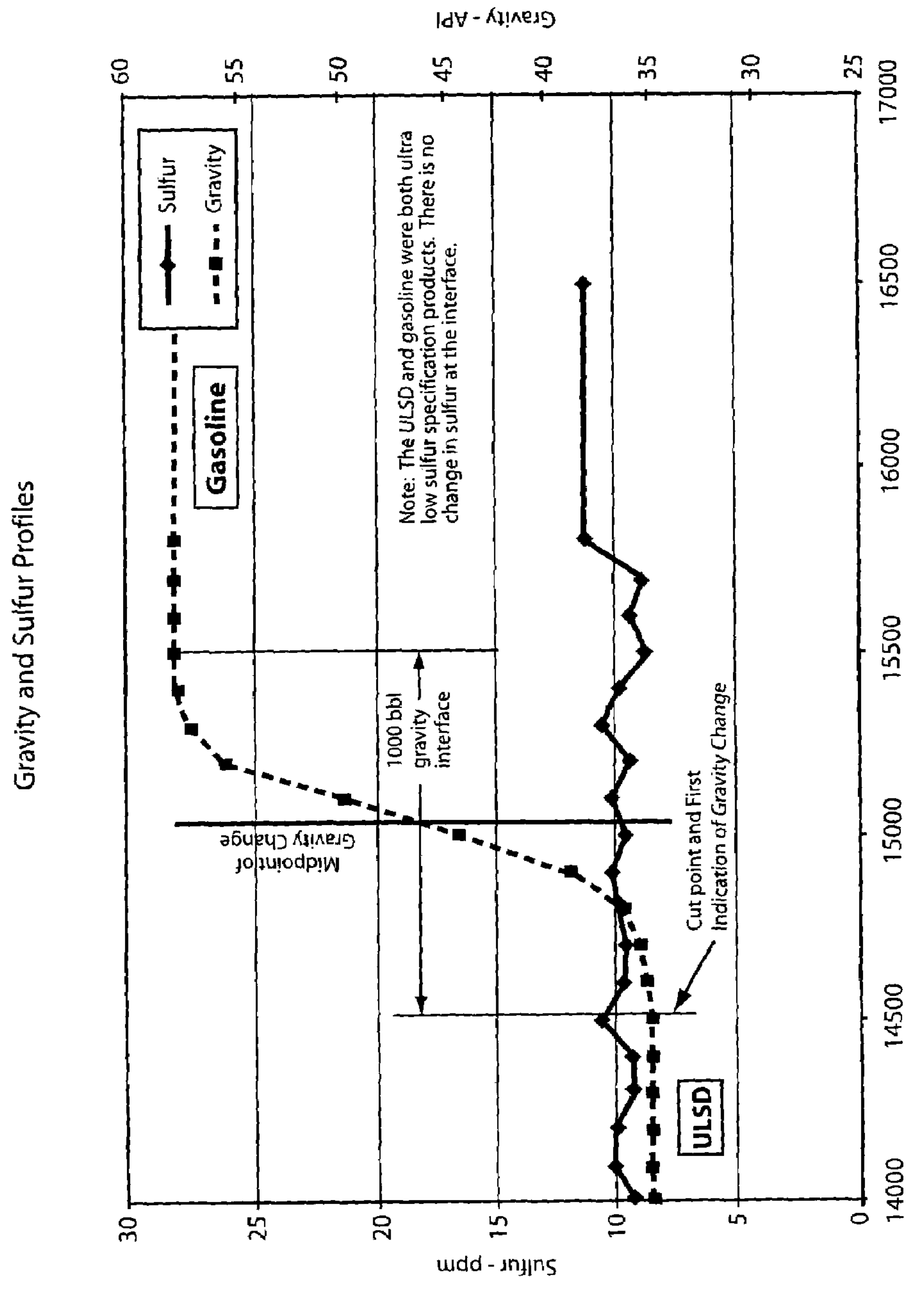
FIG. 9 is a graph showing gravity and sulfur profiles between ULSD and gasoline during an in field pipeline movement test.

The graph in FIG. 9 shows the gravity and sulfur profiles at the ULSD and gasoline interface at the termination of the pipeline at storage tank 2. This graph is the tail-end of the ULSD batch. The gasoline batch had 11 ppm sulfur content while the ULSD was 9 ppm; due to the small difference in sulfur content there was no increase in sulfur at the tail-end of the ULSD batch. The pipeline cut was made at the first indication of gravity change and the ULSD was protected adequately with this procedure.

Figure 10:
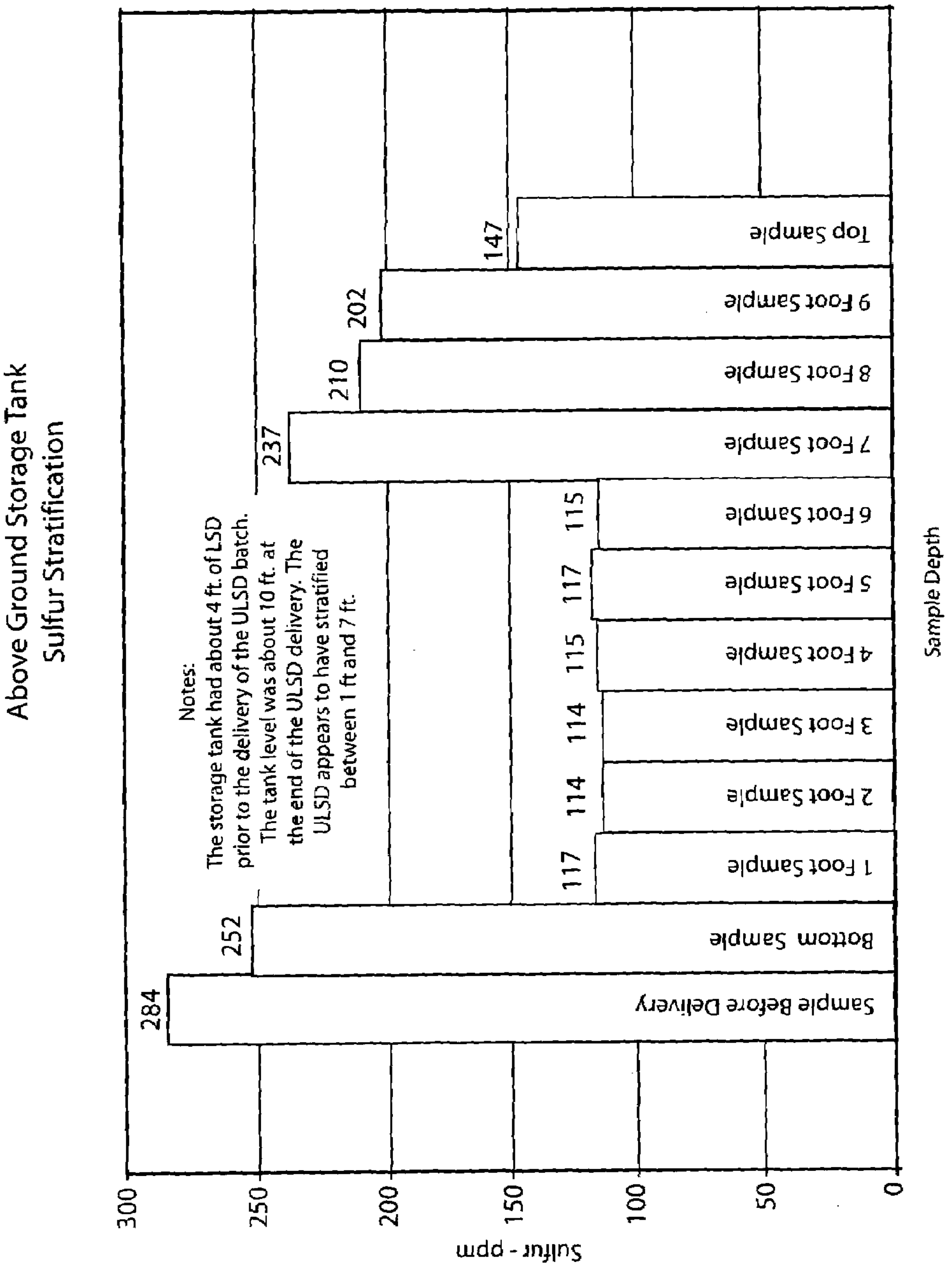
FIG. 10 shows sulfur content at different sample heights in a storage tank that contained LSD to which ULSD was added.

Additional storage tank testing was performed to determine if diesel fuels with different sulfur contents stratify in a tank or completely mix. If products stratify into layers determined by sulfur content, then tank sampling of fuels for sulfur content analysis must be done at several depths to get an accurate reading of sulfur. For example, in one in-field test, a 55,000 barrel above ground storage tank containing approximately 5,600 barrels of LSD was used to test for product stratification. In this test, 9,552 barrels of ULSD was pumped into the tank containing the LSD through a 10" receipt line at a flow rate of approximately 2,600 barrels per hour. After the pumping was complete, samples were drawn from the tank to determine if the sulfur content was consistent throughout the tank or if it stratified. FIG. 10 shows the result of the sulfur testing which showed that the ULSD seemed to stratify between a depth of 1 and 7 feet in the above ground tank. This observation of stratification indicates samples must be taken at a variety of tank levels to obtain an accurate reading of the overall sulfur content in the tank and that samples taken at just one level may not be reflective of the overall tank content.

Tests were performed to determine sulfur contamination issues associated with transport (truck) deliveries of ULSD. In one field test, all four of the compartments of a conical, sloped bottom transport were previously used to deliver jet fuel. Prior to loading the ULSD, two of the compartments were left as is, one compartment was completely drained, and one compartment was flushed with ULSD. In all cases, the compartments were filled with 300 gallons of ULSD. Samples from the load arm (transport filling pipe at the terminal storage tank) were obtained both for the ULSD and for the prior jet fuel load; these samples provided a baseline measurement of sulfur ppm prior to being loaded into the transport compartments.

Figure 11:
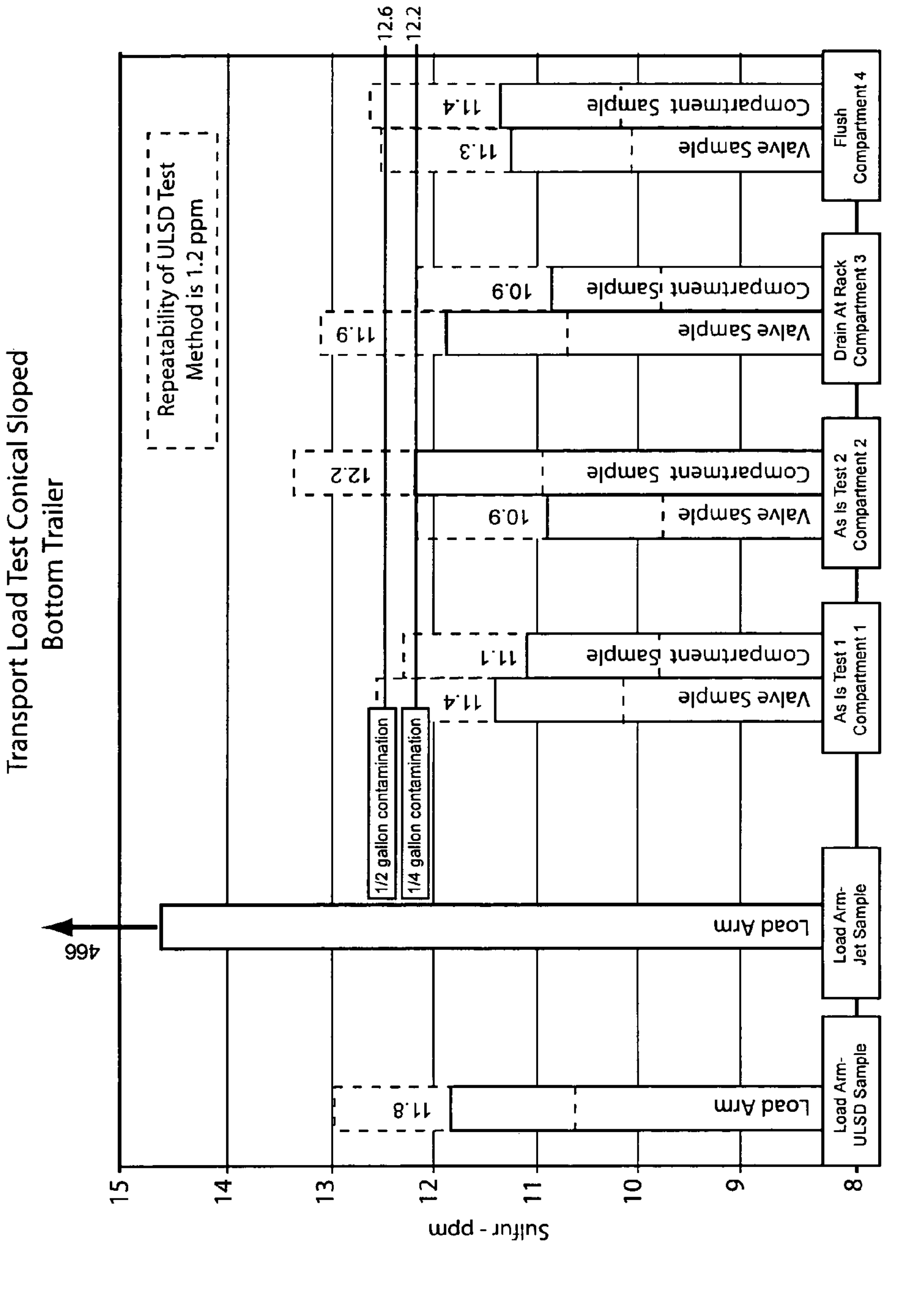
FIG. 11 shows sulfur content of ULSD sampled from terminal load arms and various compartments in a truck transport tank.

FIG. 11 shows that there is a small increase in sulfur content of the 300 gallon ULSD load for a conical sloped bottom trailer after a delivery of 466 ppm sulfur jet fuel. Draining the compartment did not completely reduce the sulfur contamination. Flushing the compartment prior to ULSD loading did eliminate the sulfur contamination.

Similar tests were also performed on sloped bottom transport and flat bottom transport trailers. It was concluded that when switching transport compartments from a higher sulfur product to ULSD, draining or flushing procedures must be developed to ensure the sulfur quality of ULSD.

Figure 12:
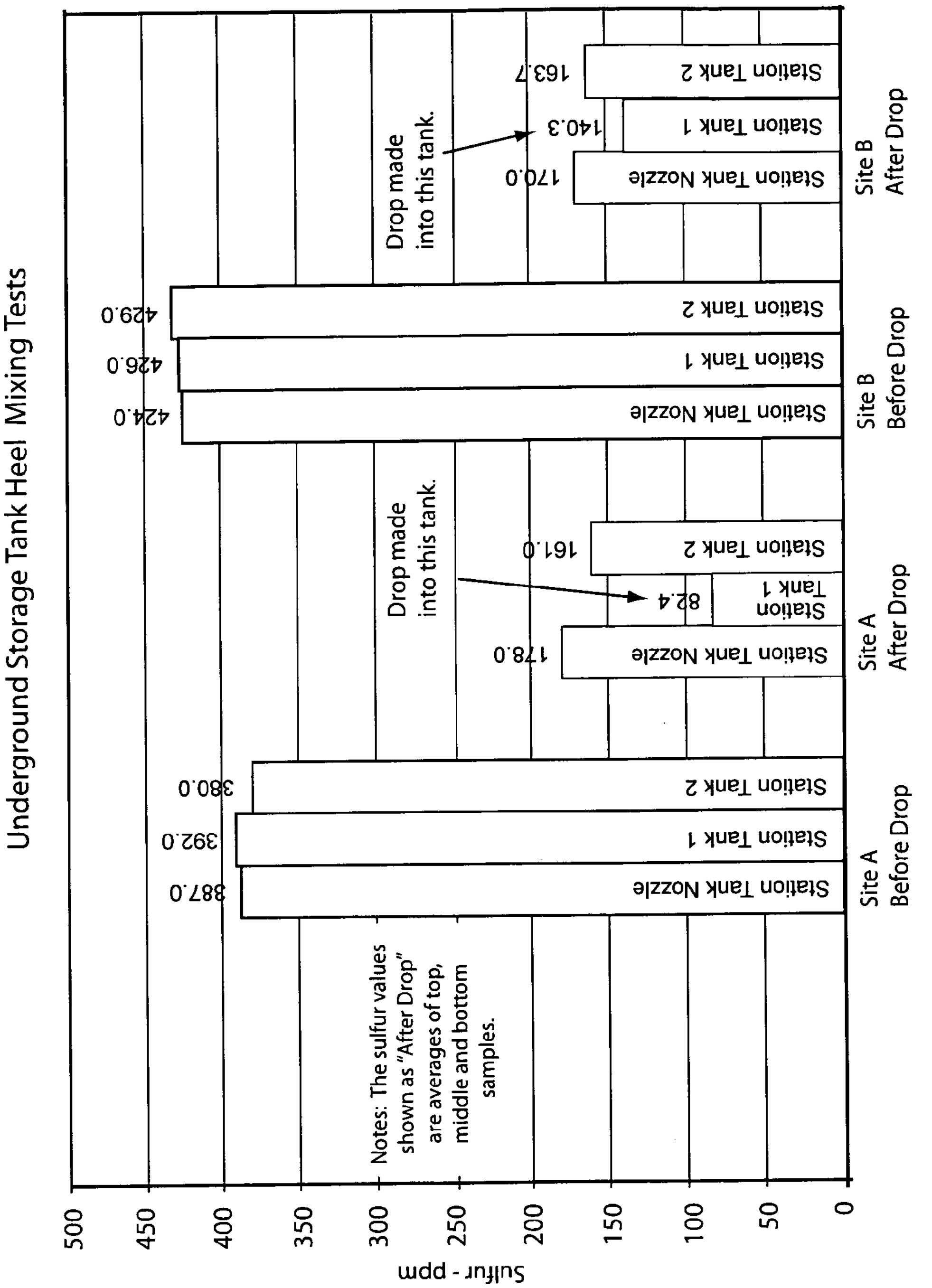
FIG. 12 shows the typical test results of underground storage tank composite samples at two retail locations with manifold tanks.

To test potential sources of contamination when transporting ULSD to retail (service station) operations, transport trucks delivered loads of ULSD to underground storage tanks at several retail facilities. Many underground storage tanks at retail locations are manifolded together, that is, they are interconnected with pipe so that the contents in one tank are shared across all tanks that are manifolded together. The objective of this particular field test was to determine if ULSD and high sulfur diesel mixed or stratified in manifolded retail underground storage tanks. A total of 6 tank heel mixing tests were completed at two separate retail stations. FIG. 12 shows typical test results of Underground Storage Tanks (UST) composite samples at two retail locations used during one of the field tests. Retail site A had two manifolded tanks and retail site B had two manifolded tanks. Each location received ULSD into one of the manifold tanks and samples from the tanks and nozzle were taken both before and after the receipt. The composite samples show the sulfur level is lower in the tank where the actual drop occurred. It was concluded that Underground Storage Tanks (USTs) may be converted to ULSD service with advance planning of multiple deliveries to ensure the sulfur content of ULSD does not exceed 15 ppm at the dispenser.

Test Conclusions

Test procedures previously described consisted of testing how the sulfur content of ULSD may be affected when transporting the fuel through a typical petroleum transportation system consisting of marine (barge) operations, pipelines, storage tanks, transport trucks and retail operations. The conclusions from these tests are listed in the section below. Testing was performed both on barge loading and off-loading operations. The tests concluded that prior to loading a barge with ULSD, barge stripping procedures, which consist of draining all barge compartments to provide adequate barge cleanliness to protect the quality of ULSD. Subsequently, it was concluded that if normal stripping procedures are followed, there will be no impact on the sulfur content during the transport of ULSD via barge. It was also concluded that barge loading from terminal tankage presents no contamination problems beyond the creation of a nominal interface. It was determined that a site specific normal line flush of ULSD is adequate preparation for loading a barge. Testing was also performed to determine how the ULSD sulfur levels were affected during a marine barge off-loading process. It was concluded from the off loading test that there was no gain in sulfur content when off-loading ULSD from a barge to terminal tankage. In addition, it was concluded that barge off-loading operations did not contaminate ULSD beyond the head and tail pipeline interfaces and a site specific normal line flush of ULSD is adequate for protecting the quality of ULSD when off-loading from a barge to terminal tankage.

The pipeline tests concluded that, with the exception of an interface wherein a product having a sulfur content >500 ppm is batched with ULSD, ULSD may be transported via pipeline using normal operating procedures without sulfur contamination beyond normal pipeline interface volumes when there is a sufficient gravity differential between the products. It was also concluded that pipeline cuts made at the last indication of gravity change at the head-end of the pipeline interface and at the first indication of gravity change at the tail-end of the pipeline interface, except when batched with a product having a sulfur content >500 ppm, appears to adequately protect the ULSD. In addition, it was concluded that determination of last and first indications of sulfur change may require the establishment of new field procedures. When batching ULSD against HSD however, it was concluded that cut procedures based on gravity alone are not adequate to protect the ULSD. It was also determined, that when batched against HSD, that cut procedures based on a red dye indicator are not adequate to protect the quality of the ULSD. Thus, it was concluded that if possible, pipeline scheduling should not batch a >500 ppm sulfur product behind ULSD. If the high sulfur product is batched behind a ULSD batch and the cut is late, an entire ULSD tank could be contaminated. It was also concluded that when batching a high sulfur product >500 ppm in front of ULSD, the cut procedures should be at double the normal interface volume. New written cut procedures were necessary for handling ULSD interfaces and ensuring that field employees are properly trained.

After the storage tank testing it was concluded that normal drain drying of drain dry designed tanks and tank lines will adequately protect the quality of ULSD. It was also concluded, after two tank turns, a drained tank could usually be converted to ULSD service. It was also determined that in non-drain dry designed storage tanks, normal drain drying of tanks and tank lines may not be sufficient to protect the quality of ULSD. In addition, it was concluded that ULSD can stratify if pumped into a tank containing another distillate product and for that reason; a single tank sample at one depth will not represent the overall sulfur level of the product in the tank.

Tests performed with ULSD and transport truck tanks were performed with different types of transport tanks. It was concluded that some flat bottom transports present significant contamination issues when loading ULSD. The contamination level of flat bottom transport trailers was reduced by draining each compartment at the loading rack prior to loading the ULSD. The contamination level of slope bottom transport tanks did not present contamination issues, assuming the compartment was properly drained at the delivery site, prior to loading the ULSD. For both flat and sloped bottom transports, flushing the compartments with ULSD prior to the actual loading of ULSD effectively removed any residual sulfur contamination.

For retail operations which store fuel in underground storage tanks (USTs) it was determined that the tanks may be converted from higher sulfur diesel to ULSD service with multiple drops of ULSD into each tank. It was also concluded that stratification of fuels did occur in UST's at retail marketing facilities if those tanks were more than 40% full of higher sulfur product. For this reason it was determined that inventories should be drawn down to a low level in UST's prior to ULSD conversion to enable mixing.

In addition to the test results and conclusions derived from the testing described above, findings from other tests were considered when establishing a set of procedures for the transporting of ULSD.

As a result of the testing methods and conclusions described above, a set of procedures were created to mitigate various sources of sulfur contamination while transporting ULSD through a petroleum transport system. The procedures are as follows.

Product Quality Marker Management Procedure

A Product Quality Marker (PQM) is a segment of a batch that has or is suspected to have a quality impact of sufficient amount that it could cause a batch or receiving tank to be off specification. This can be caused by incompatible product being introduced from a deadleg, spare unit, sump injection, etc. Analysis of the PQM is needed to determine if sufficient incompatible product exists to cause a quality issue. Such an analysis includes monitoring the size of the batch, sulfur content of incompatible product, volume contained in the receiving tank, whether other PQM's could occur en route, historical sulfur information, etc., thus making our informed decision as to whether the PQM would need to be managed at the destination by being cut out.

Depending upon the situation, PQM procedures may be performed by operations center analyst, field operations personnel, operations center supervisor/specialist, product quality group, pipeline product scheduling department, or other subject matter experts as needed.

The steps for managing a PQM are as follows:

Step 1, performed by an operations center analyst or by field operations is to determine if a PQM exists or may be created. If a PQM already exists, then proceed to step 2. If PQM has not been created but could possibly be created, proceed to step 3. If PQM does already exist, it should be verified within batch tracking records, if not it should be inserted manually into the batch tracking records.

Step 2, performed by an operations center analyst, is to determine the estimated time of arrival (ETA) at the destination (delivery) point If the ETA is greater than the predetermined time, for example 3 hours, then proceed to step 3. If the ETA is less than the predetermined time, the batch should be slowed down enough to allow time to manage the PQM concern then proceed to step 3 or shut down the batch and initialize a shut down and start-up procedure.

Step 3 is performed by an operations center specialist or designee who utilizes the PQM diagnostic guide. A plan on how to deal with the quality marker issue is documented and attached to the PQM data.

Step 4 is performed by an operations center analyst and/or field operations. The recommended PQM plan from the PQM resource team should be followed to manage the PQM at the destination.

In Step 5, an operations center specialist or designee should forward necessary documentation to the appropriate contacts.

Mainline Unit Start Procedure

This procedure is intended to protect ULSD batches from sulfur contamination when mainline pumps begin operation with an incompatible product located in the station piping and unit. This procedure is followed when it is determined that a unit start-up is needed to maintain a desired flow rate, hydraulic condition or other operational requirement and is necessary in order to prevent ULSD contamination. This procedure is intended to help personnel understand the process involved with starting up mainline units, and assists personnel in performing the step-by-step procedures necessary to track the incompatible product located in a unit if that unit is started.

The mainline unit start procedures are operational procedures that are instituted when there is a need to start a pumping unit and are performed by field operations personnel or operations center analysts.

The steps of the procedure are as follows:

In Step 1, the Computational Pipeline Monitoring (CPM) system tracks the contents of mainline pump units and tracks batch locations throughout the pipeline system.

In step 2 an operations center analyst determines when specific units need to start.

In Step 3 an operations center-analyst and/or field operations personnel verifies unit contents with the Supervisor Control and Data Acquisition (SCADA) system or through field notes. If it is determined that the product contained in the Unit is compatible with ULSD, then proceed with starting the mainline unit. If the product is determined to be incompatible, then proceed to process Step 4. During this step, the SCADA system will generate a warning signal if there is an incompatible product in the unit and if the head-end of the ULSD batch is a pre-established period of time or less away from the station or pre-established period of time or less after the tail-end of an ULSD batch has passed the station.

In Step 4, a PQM resource team will invoke PQM management rules to deal with any incompatible products in the unit and in Step 5 an operations center analyst or field operations will execute a plan to manage any PQM.

Mainline Unit Stop Procedure

This procedure is intended to protect ULSD batches from sulfur contamination when a mainline unit stops operating with incompatible product in the station piping. This process occurs when it is determined that a unit stop is needed to maintain a desired flow rate, hydraulic condition or other operational necessity.

The mainline unit stop procedures are operational procedures describing the steps that should be taken when there is a need to stop a unit. In the event of a stop to a mainline unit containing incompatible product, the steps below define the proper documentation of the contents of the unit which has been stopped with having incompatible product in it.

In Step 1 of this procedure, the CPM system tracks the contents of all mainline pump units and tracks batch locations throughout the pipeline system.

In Step 2, an operations center analyst determines the need to stop a mainline unit to maintain a desired flow rate, hydraulic condition, or other operational necessity.

In Step 3, an operations center analyst verifies the contents of the affected unit with the SCADA system or by field operations. If the unit contents are compatible with ULSD, then proceed to the steps outlined in Step 5. If the unit contents are incompatible, then proceed to the procedure of Step 4.

In Step 4, a PQM resource team will invoke the PQM management philosophy to deal with any incompatible products that are left in the unit. The PQM resource team will utilize disciplined decision making tools to develop a plan and manage the PQM throughout the pipeline system.

In Step 5, an operations center analyst or field operations technician will issue a stop order to the affected unit. If compatible product is contained in the unit no warning will be issued by the SCADA system. Once the unit is successfully stopped with no contamination, the process is complete. If incompatible product is contained in the unit, a warning will be issued by the SCADA system and an override will be necessary to proceed with the stopping of the unit. In this case an operations center specialist or supervisor is required to give clearance to proceed through the override. Once the unit is stopped, the unit contents will be documented either automatically by the SCADA system or manually by an operations center analyst and/or field operations technician.

Sump Pump Out Procedure

The Sump Pump Out procedure is intended to protect ULSD batches from possible sulfur contamination when sumps pump into the petroleum transport mainline. This applies to any product the sump is discharging into the mainline. Sumps can be located at both origination and delivery stations, but generally the procedure apply to unmanned mainline booster stations. This procedure is performed by either field technicians or pump station operators.

Procedures have been established for both automatic and manual sump systems.

The automatic sump pump out procedures is as follows:

In Step 1 the SCADA/CPM systems tracks ULSD batches and in Step 2, the SCADA/CPM system remotely monitors the sump levels.

In Step 3 SCADA determines whether the head-end of the ULSD batch is within a site specific pre-established period of time from the station or that the tail-end of an ULSD batch has passed station within a site specific pre-established period of time. If the ULSD batch head- or tail-end is more than a site specific pre-established period of time away, then the sump can be in normal operation.

In Step 4, if the SCADA determines that the head-end of the ULSD batch is within a site specific pre-established period of time of the station or that the tail-end of an ULSD batch has passed but is within a site specific pre-established period of time of the station, then the sump will be in an inhibited operation. In this case the SCADA system sends a command to the sump, which will inhibit the sump from pumping, and the SCADA system returns the sump to a normal status after the batch is a site specific pre-established period of time past the station. In this case the sump pump is inhibited from running during the passing of the ULSD batch and its surrounding safe zone.

In Step 5, if the sump level reaches a site specific predetermine height, then the sump will override the disable command. In this mode the sump will run, the CPM/SCADA system will generate an alarm alerting the operations center analyst that the sump has pumped, and a PQM will be placed into the Batch Tracking via the CPM/SCADA system.

In Step 6 the PQM Resource Team will execute a PQM Procedure if the sump pumps into a ULSD batch. The result of this procedure is that the PQM will be managed.

The manual sump pump out procedures is as follows:

In Step 1 the field operations technician and/or an operations center analyst will notify operations center personnel or local operations and indicate the station location and the reason for suspension of its automatic sump operation. Such reasons may include maintenance, monthly testing, annual sump testing or other sump concerns. Next, field operations will confirm with the operations center that any product contained in the mainline or station piping is not ULSD. Field operations will then confirm with operations center that a ULSD batch is not within a site specific pre-established period of time, head-end or tail-end, of the station.

In Step 2, field operations technicians or operations center analysts will determine whether the sump being pumped will not cause a product quality issue. If the sump will not cause a product quality issue the following procedures will be executed:

- Switch sump from automatic to manual, or
- Start manual sump
- Operate sump until desired level is achieved
- Complete task(s) requiring sump to be in manual operation
- Return sump to normal automatic operation after sump work is done
- Notify Operations Center that work is complete and sump is returned to normal operations
- Proceed to Step 4 in the Automatic Sump Procedures.

If the Sump being pumped will cause a product quality issue, then proceed to Step 3 in the Automatic Sump Process. The result of this process is that ULSD product quality will not be jeopardized due to an unplanned manual start up of a sump.

Product Compatibility/Cut Matrix Development Procedure

Figure 13:
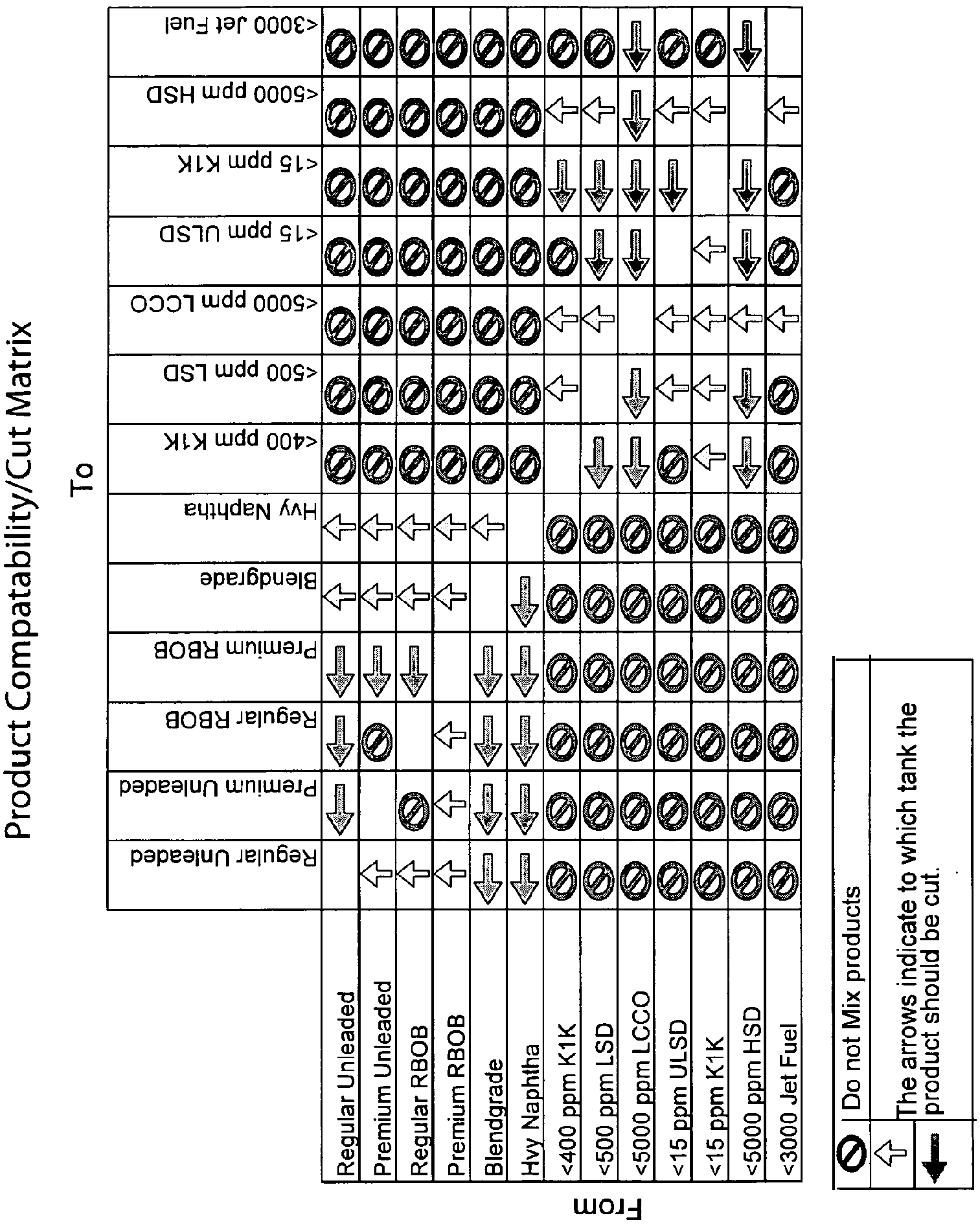
FIG. 13 is a product compatibility/cut matrix.

The Product Compatibility/Cut Matrix (FIG. 13) was developed to show which petroleum products are compatible with each other. Product compatibility has become more important with Ultra Low Sulfur products and High Sulfur products moving through the same pipeline facilities. This matrix is used to determine what products can be downgraded to other products without raising the sulfur content. The matrix can also be used to develop cut procedures and define when operational events such as sump pumpouts and unit starts could contaminate product batches. FIG. 13 is an example of the completed Product Compatibility/Cut Matrix.

Prover Documenting and Realigning Procedure

This procedure was developed to protect product quality while realigning a dedicated prover at a receipt or delivery location. This procedure may be performed by operations center analysts or field personnel.

Before beginning this procedure it was determined that personnel should consider the following:

- The Product Compatibility/Cut Matrix Chart should be utilized when determining whether products contained in the prover and product flowing by are compatible.
- Consideration should be given to changing the prover alignment when products are compatible.
- It is recommended that the provers and prover inlet and outlet lines be laid down with ULSD; if this is not possible low sulfur gasoline should be utilized.
- Laying a prover and prover inlet and outlet lines down with high sulfur product is not recommended.
- The meter furthest from the prover should be used as the primary meter to keep the prover lines completely flushed at all times.
- This procedure will be used when a prover flush is not possible or cannot be successfully executed without contaminating the ULSD.

The prover documenting and realigning procedure consists of the following steps.

In Step 1, operations center and/or field personnel determine the need to realign the prover.

In Step 2 the contents of the product contained within the prover inlet and outlet lines and the product flowing through the prover meter are determined.

In Step 3, utilizing the Product Compatibility/Cut Matrix previously developed, the compatibility of the products from Step 2 is determined.

In Step 4, if the products are compatible, affected parties are notified and operations center personnel or field personnel will skip step 5 and proceed with prover realignment utilizing Step 6 of this procedure. If the products are not compatible and personnel determine that the need to realign the prover still exists, then proceed to the next step, step 5.

In Step 5, operations center and/or field personnel utilize the PQM management philosophy to manage any PQM event, then proceed to step 6 to realign the prover.

In Step 6, operations center and/or field personnel utilize the following sequence to bypass the prover from the flow path:

1. Open prover bypass valve
2. Close prover inlet valve
3. Close prover outlet valve To turn the prover back into the flow path the following sequence is utilized:

1. Open prover outlet valve
2. Open prover inlet valve
3. Close prover bypass valve Procedure for Documenting Product in Meter Bypass This procedure is for documenting the products that are in a meter bypass in a petroleum pipeline system to ensure product quality is maintained throughout the system. Depending upon the specific situation, this procedure can be performed by operations center field analysts or field personnel.

The party responsible for aligning the meter bypass valves is responsible for documenting the contents of the meter bypass. The documentation in this procedure utilizes documentation tools such as computerized spreadsheets, line fill tracking logs, log books and other proprietary documents.

This procedure utilizes a number of steps for field personnel to determine if and when to utilize a meter bypass at a receipt or delivery location to ensure that product quality is maintained.

Step 1 of this procedure is for field personnel to determine the need to use a meter bypass by following steps 2 through 5.

In Step 2 of this procedure, field personnel must determine the contents of products contained within the meter bypass and the product flowing through the meter itself.

In Step 3, utilizing the Product Compatibility/Cut Matrix, the compatibility of the products from step 2 is determined.

In Step 4, if it is determined that products are compatible, use the Commissioning, Decommissioning, and Recommissioning Plan to utilize the meter bypass. If it is determined that the products are not compatible and field personnel determines that the need to use the meter bypass still exists, then proceed to step 5.

In Step 5, the PQM management philosophy and Commissioning, Decommissioning, and Recommissioning plan are used to utilize the meter bypass.

Procedure for Managing Transmix Injections

This procedure outlines the steps on how to perform a transmix injection while keeping the batch being injected into below the sulfur specification set forth in the regulation. This procedure can be performed by either the operations center analysts or field operations technicians. In most cases field operations technicians will perform the injections. Prior to implementing this transmix procedure, personnel need to be cognizant of the following:

When a batch of gasoline is found to be at the higher end of the sulfur release specifications, the product quality group will be contacted to determine if transmix should be injected into the batch.

Review the schedule for batches of Regular Unleaded and Blendgrade that can have transmix injected into them.

Determine whether the operations center or the field operator is going to initiate, monitor and discontinue the transmix injection.

The steps for implementing this procedure are as follows:

In Step 1, the operations center is contacted to verify the batch to be injected.

In Step 2, determine the sulfur release specification of the batch to be injected. If the sulfur release specifications are low enough for the batch, continue with the injection plan. If the batch to be injected is found to be at the higher end of the sulfur release specifications the product quality group will be contacted. The product quality group will determine if the transmix injection can continue into the batch. If the sulfur release specifications are too high to allow the injection, wait for another Regular or Blendgrade batch for injection.

Step 3, once it is determined that the batch can be injected, notify the operating center that the transmix injection is about to begin.

Step 4, open the appropriate valves needed for transmix movement and arm the pump.

Step 5, start the transmix injection.

Step 6; stop the transmix injection when appropriate.

Step 7, close the appropriate valves and de-arm the pump.

Step 8; notify the operations center that the transmix injection is complete.

Batch Sequencing Procedures

To protect the quality of ULSD, pipeline batch sequence procedures must be instituted. Individuals that must be trained in proper batch sequencing procedures include Products Schedulers, Field Operations Technicians and Operations Center Analysts. These individuals must be familiar with and execute these practices.

Batch sequence procedures should be implemented under the following normal conditions:

When establishing a schedule for products movements, and

When executing a schedule for products movements, and

When transferring product within a facility, or

When interfaces between products could cause contamination.

In Step 1 of this procedure, the products scheduler or field operations personnel determine the product to be moved.

In Step 2, the acceptable sequence of products that may be moved before and after a USLD batch must be identified. It should be noted that batch sequencing will make every effort to avoid having a high sulfur product >80 ppm behind an ULSD product. If this can not be achieved a special plan will need to be instituted. A schedule or local product transfer procedure will be written for the appropriate sequence.

In the final step, Step 3, the batch movement will be executed per the written plan or schedule.

Batch Cut Procedures

These batch cut procedures are intended to be used when making a pipeline batch cut between ULSD and a different petroleum product. The process provides direction on managing products to avoid a negative product quality impact. Individuals that must be trained on this procedure include products schedulers and accountants, field operations supervisors and technicians, and operations center analysts, specialists and supervisors.

The objective of these procedures is to familiarize personnel with unlike product to product pipeline interface cut procedures and to communicate the expectation that all cuts involving ULSD must follow this process.

In Step 1 of the batch cut process a scheduler, field operations personnel or the operations center analyst determines the product batches to be moved or transferred and the potential interfaces between unlike products.

Next, in Step 2, the same personnel prepare a schedule or local plan to manage the cut.

In the final step, Step 3, the cut is executed and ticketed per planned procedures from Step 2.

Examples of cut procedure plans are below, in the first example, a cut is being made between ULSD and gasoline.

EXAMPLE 1

Ultra Low Sulfur Diesel (<15 ppm) to Gasoline

1. Operations Center Analyst calls field operations technician at pre-determined time prior to batch change.
2. Operations Center Analyst and Field operations technician will confirm the following:
    a. Confirm at location
    b. Schedule number
    c. Current Delivery
    d. NextBatch
    e. Batch sizes
    f. Tank Line-up
    g. Correct meter set up
    h. Go over cut procedure 3. Operations Center Analyst will set up delivery meter for the upcoming cut: insert proper batches, batch sizes, tank numbers, Partial/Final status and other necessary information.
4. The field operations technician will follow the guidelines of a predetermined Sampling & Testing Program to ensure samples are taken during delivery and documented appropriately.
5. If needed, Operations Center Analyst or Field Operations Technician will open appropriate manifold valve to tank if header allows.
6. Operations Center Analyst and Field Operations Technician monitor upstream gravity.
7. Operations Center Analyst and Field Operations Technician calculate midpoint between the gravities of the two products.
8. ULSD must be protected, turn away from ULSD tank (typically to transmix) at first indication of gravity change and create necessary ticketing.
   a. Result—The beginning of the batch interface has been identified and ULSD is protected.
9. At predetermined gravity turn to gasoline tank and create necessary ticketing.

EXAMPLE 2

Ultra Low Sulfur Diesel (ULSD <15 ppm) to High Sulfur Diesel (HSD >500 ppm)

1. Operations center analyst calls field operations technician predetermined time prior to end of batch change.
2. At a predetermined time before end of batch, field operations technician will confirm the following with the operations center analyst:
   a. Confirm at location
   b. Schedule number
   c. Current Delivery
   d. Next Batch
   e. Batch sizes
   f. Tank Line-up
   g. Correct meter set up
   h. Go over cut procedure
3. Operations Center Analyst will set up delivery meter for the upcoming cut: insert proper batches, batch sizes, tank numbers, Partial/Final status and other necessary information.
4. The field operations technician will follow the guidelines of a predetermined Sampling & Testing Program to ensure samples are taken during delivery and documented appropriately.
5. A field operations technician and operations center analyst will monitor upstream gravity.
6. A field operations technician and operations center analyst will observe start of gravity change from Ultra Low Sulfur Diesel to High Sulfur Diesel.
7. At a predetermined gravity difference (such as greater than (>) 2.0° API), turn to appropriate tank or connecting carrier approximately one (1) interface volume after the last indication of gravity change and create necessary documentation. or
8. At a predetermined gravity difference (such as less than (<) 2.0° API), turn to appropriate tank or connecting carrier utilizing meter counts approximately one and one half (1½) interface volumes after the end of high sulfur diesel batch and create necessary documentation.

By following this procedure the end of the batch interface has been identified and the ULSD is protected.

Product Transfer Document Procedures

In normal operation, for each product transfer in a petroleum transportation system there is a document or 'ticket' created and distributed by a centralized scheduling database system. Depending on the situation, this procedure can be performed by a pipeline product movements accountant or by scheduling database system IT personnel The sulfur control regulations contained in 40 CFR Part 80 include Product Transfer Documentation (PTD) requirements.

The purpose of this procedure is to comply with the documentation requirements for clean fuels. The procedure is that all required Product Transfer Document statements are to be printed on each ticket as it is created before being distributed by the centralized scheduling database system to all shippers and connecting carriers.

Step 1 of the procedure is to setup each new fuel grade within the centralized scheduling database and apply applicable statements to each grade.

Step 2 is to ensure that the following information is listed on each transfer ticket:

Name and address of transferor and transferee

Volume of diesel fuel or distillate

Location of transfer

Date of transfer

For transfers of MVNRLM diesel fuel: the sulfur content

Facility Registration Number

Accurate statement of Designation or Classification

Procedure for Tracking Highway ULSD to Highway LSD Downgrades

Per the sulfur control regulations in 40 CFR Part 80), the Highway Ultra Low Sulfur Diesel (ULSD <15 ppm) that can be downgraded to the Highway Low Sulfur Diesel (LSD <500 ppm) pool is limited to a maximum of 20% of the volume of highway ULSD received on an annual, calendar year basis. Compliance shall be for a period of Jun. 1 through Dec. 31 for 2006, Jan. 1 through Dec. 31 for 2007-2009, and in 2010 compliance shall be for the period Jan. 1 through May 31. This procedure involves the documentation of these downgrades for reporting to the E.P.A. Pipeline custody receipt and delivery tickets will be utilized to calculate the annual 15 ppm Ultra Low Sulfur Diesel Fuel downgraded to the less than 500 ppm Low Sulfur Diesel.

Depending on the situation, this procedure can be performed by a pipeline product movements accountant or by scheduling database system IT personnel.

In Step 1 of this procedure, scheduling database IT personnel generate reports to capture custody ticket data to ensure reporting requirements are completed. The formulas are located within 40 CFR Part 80.

In Step 2 of this procedure a pipeline product movements accountant ensures that the following information is listed on each ticket.

Calculate volume balance for motor vehicle diesel fuel.

Calculate motor vehicle diesel fuel received.

Calculate motor vehicle diesel fuel delivered.

The neutral or positive volume balance required for purposes of compliance.

Calculate the volume in verses volume out in which volume balance can not exceed 2% gain/loss.

Calculate volumes received from a non registered EPA facility.

Calculate the 20% downgrade from on-road to non road by ULSD 15 ppm into facility by 80%.

Procedure for Non-Road Reporting of Designate and Track

The Federal EPA has defined a Designate and Track option that will allow on-road and non-road 500 ppm sulfur diesel to be moved fungible.

The Non-Road Locomotive and Marine Reporting requirements are listed within 40 CFR Part 80.

This procedure utilizes pipeline custody receipts and delivery tickets to calculate the required reporting outlined within the rules and regulations are defined within 40 CFR Part 80.

Depending on the situation, this procedure can be performed by a pipeline product movements accountant or by scheduling database system IT personnel.

Following the procedural steps below ensures that the required reports are filed on a quarterly and annual basis based upon information provided from custody receipt and delivery tickets.

In Step 1, reports are generated to capture custody ticket data to ensure reporting requirements are completed. The formulas are located within 40 CFR 80.

In Step 2 a product movement accountant verifies and ensures that the following information is listed on each report:

Calculate a facility's high sulfur NRLM balance.

The volume balance for purposes of compliance.

Calculate a facility's heating oil volume balance.

Calculate volume of Heating Oil ≦0.

Calculate volumes received from a non registered EPA facility.

Calculate 500 ppm Non-Road diesel fuel balance.

The Non-Road 500 balance ≧0 balance required for purposes of compliance.

Calculate 500 PPM sulfur motor vehicle diesel fuel into facility and delivered out incorporating 20% downgrade of 15 ppm product.

The above description of testing procedures, results and transfer procedures provides an example of the methods and processes necessary to protect the integrity of ULSD while maintaining its documented sulfur content at or below 15 ppm during transport and storage. The invention is further defined in the following claims.

We claim:

1. A method for monitoring the overall sulfur content of ultra low sulfur diesel having a maximum sulfur content equal to or less than 15 parts per million and for ensuring that the sulfur content remains at or below a predetermined specification during movement of the fuel through a petroleum transport, terminal and retail system comprising the steps of:

transporting the ultra low sulfur diesel as a batch through a pipeline and having a second batch of different fuel with a higher sulfur content at its head-end interface and a third batch of different fuel with a higher sulfur content at its tail-end interface, wherein a first batch cut is made after the last indication of gravity chance at the head-end and second batch cut is made at the first indication of gravity chance at the tail-end, thus preserving the sulfur content integrity of the ultra low sulfur diesel;

wherein the volume of the second fuel located at the head-end interface between the first indication of gravity change and the last indication of gravity change at the head-end is defined as the head-end interface volume and if the second fuel consists of a high sulfur fuel having a sulfur content greater than or equal to 500 parts per million, then the first batch cut is made at an interface volume greater than the head-end interface volume.

2. The method of claim 1, wherein the volume of the third fuel located between the tail-end interface between the first indication of gravity change and the last indication of gravity change at the tail-end is defined as the tail-end interface volume and if the third fuel consists of a high sulfur fuel having a sulfur content greater than or equal to 500 parts per million, then the second batch cut is made at an interface volume greater than the tail-end interface volume.

3. The method of claim 1 further including the step of monitoring the petroleum transport, terminal and retail facilities for the presence of a product quality marker and analyzing the product quality marker to determine if the sulfur content of the product quality marker is sufficiently incompatible with the fuel so as to cause the sulfur content of the fuel to go off specification.

4. The method of claim 3 wherein the analysis of the product quality marker includes some or all of the following procedures; monitoring the size of the fuel batch, sulfur content of the incompatible product, volume of the receiving tank, the presence of other product quality markers en route, and the historical sulfur information for the fuel batch.

5. The method of claim 4 further including the step of determining if the estimated time of arrival of the product quality marker at the destination is greater than a predetermined period of time and implementing a plan to manage the product quality marker at the destination.

6. The method of claim 5 wherein if the estimated time of arrival is less than a predetermined period of time, including the step of slowing the transfer rate of the fuel batch to allow time to formulate and implement the management plan.

7. The method of claim 1 further including the steps of:

monitoring the contents of one or more mainline pump unit(s);

monitoring fuel batch locations throughout the system;

determining the time that a specific mainline pump unit needs to become operational; and if the content of the specific mainline pump unit is incompatible with the approaching fuel batch, issuing a product quality marker to procedurally manage the incompatible content.

8. The method of claim 1 further including the step of monitoring the contents of at least one sump located in the pipeline for incompatibility with an approaching fuel batch and developing a set of procedures to manage any product quality marker issues.

9. The method of claim 1 further including the step of monitoring the contents of at least one prover located in the system for incompatibility with the approaching fuel batch and developing a set of procedures to manage any product quality marker.

10. The method of claim 1 further including the step of monitoring the contents contained in at least one meter bypass located in the system for incompatibility with the approaching fuel batch and developing a set of procedures to manage any product quality marker.

11. The method of claim 1 further including the step of injecting a transmix batch into a target fuel batch consisting of the steps of analyzing the sulfur content of the target fuel batch, determining the amount of transmix to be injected including the duration of such injection, and developing a set of procedures to manage the amount and duration of the transmix injection.

12. The method of claim 1 further including the step of developing batch sequencing schedules for product movement and further step of developing batch cut procedures that utilize the batch sequencing schedule.

13. The method of claim 1 including the step of monitoring the contents of any tank located in the system for incompatibility with the incoming batch and developing a set of procedures to manage any product quality marker.

14. The method of claim 13 wherein fuels having differing sulfur contents stratify in distinct layers when combined in a tank and wherein the step of monitoring includes taking measurement of the sulfur content at predetermined interspersed levels within the tank and the step of developing a set of procedures includes a set of procedures for managing the stratified fuels.

* * * * *

UNITED STATES PATENT AND TRADEMARK OFFICE

CERTIFICATE OF CORRECTION

PATENT NO. : 7,228,250 B2
APPLICATION NO. : 11/218078
DATED : June 5, 2007
INVENTOR(S) : Neil G. Naiman et al.

It is certified that error appears in the above-identified patent and that said Letters Patent is hereby corrected as shown below:

Column 19, line 57, claim 1; please change “chance” to -- change --.

Signed and Sealed this

Thirty-first Day of July, 2007

JON W. DUDAS

*Director of the United States Patent and Trademark Office*